United States Patent
Green et al.

(10) Patent No.: US 11,113,610 B2
(45) Date of Patent: Sep. 7, 2021

(54) SYSTEM FOR BUILDING AND DEPLOYING INFERENCE MODEL

(71) Applicant: GE Aviation Systems Limited, Cheltenham (GB)

(72) Inventors: Donna Louise Green, Eastleigh (GB); Brian David Larder, Eastleigh (GB); Peter Robin Knight, Eastleigh (GB); Olivier Thuong, Eastleigh (GB)

(73) Assignee: GE AVIATION SYSTEMS LIMITED

( * ) Notice: Subject to any disclaimer, the term of this patent is extended or adjusted under 35 U.S.C. 154(b) by 916 days.

(21) Appl. No.: 14/836,288

(22) Filed: Aug. 26, 2015

(65) Prior Publication Data
US 2016/0063384 A1    Mar. 3, 2016

(30) Foreign Application Priority Data
Aug. 26, 2014 (GB) .................................. 1415079

(51) Int. Cl.
*G06N 5/04* (2006.01)
*G06N 20/00* (2019.01)
(Continued)

(52) U.S. Cl.
CPC ............. *G06N 5/04* (2013.01); *G05B 23/024* (2013.01); *G06N 20/00* (2019.01); *G06Q 10/20* (2013.01)

(58) Field of Classification Search
CPC .... G05B 23/024; G05B 19/0425; G06N 5/04; G06N 99/005; H04L 63/20;
(Continued)

(56) References Cited

U.S. PATENT DOCUMENTS

| 7,640,145 B2 | 12/2009 | Wegerich et al. |
| 7,853,431 B2 | 12/2010 | Samardzija et al. |

(Continued)

FOREIGN PATENT DOCUMENTS

| EP | 1818746 A1 | 8/2007 |
| EP | 1979794 A1 | 10/2008 |

(Continued)

OTHER PUBLICATIONS

'Artificial Intelligence and Mathematical Models fot Intelligent Managementof Aircraft Data': 2012, Knight, Univ of Southhampton, thesis.*

(Continued)

*Primary Examiner* — Li B. Zhen
*Assistant Examiner* — Peter D Coughlan
(74) *Attorney, Agent, or Firm* — Wood IP LLC

(57) ABSTRACT

A system and related method for building and deploying one or more inference models for use in remote condition monitoring of a first fleet of a first asset. The system includes model configuration data for subsequent use by a model builder application to construct one or more desired inference models for the first asset. The model configuration data is customized to the first asset and the desired one or more inference models, and is provided in a format which is easily readable and editable by a user of the system. The model configuration data is separate from the underlying processing algorithms which are employed by the model builder application in the constructing of the one or more desired inference models during a learning mode of operation of the system.

17 Claims, 4 Drawing Sheets

(51) Int. Cl.
*G05B 23/02* (2006.01)
*G06Q 10/00* (2012.01)

(58) Field of Classification Search
CPC ...... G06F 21/6236; G06F 9/546; G06F 17/30; G06F 17/00; G06F 17/60; G06F 9/44; G06F 2113/28; G06F 2119/04; G06Q 30/06; G06Q 10/00; G01H 1/00
See application file for complete search history.

(56) References Cited

U.S. PATENT DOCUMENTS

| | | | |
|---|---|---|---|
| 2003/0114965 A1 | 6/2003 | Fiechter et al. | |
| 2004/0019886 A1* | 1/2004 | Berent | G06F 8/447 717/158 |
| 2004/0111197 A1* | 6/2004 | Kipersztok | B64F 5/60 701/31.6 |
| 2004/0243636 A1 | 12/2004 | Hasiewicz et al. | |
| 2007/0088570 A1 | 4/2007 | Shetty et al. | |
| 2007/0203869 A1* | 8/2007 | Ramsey | G06F 17/279 706/52 |
| 2008/0065281 A1* | 3/2008 | Tran | G01H 1/00 701/3 |
| 2009/0234710 A1* | 9/2009 | Belgaied Hassine | G06Q 30/0206 705/7.29 |
| 2010/0223211 A1* | 9/2010 | Johnson | G06Q 10/00 706/11 |
| 2013/0116996 A1* | 5/2013 | Callan | G07C 5/0808 703/8 |

FOREIGN PATENT DOCUMENTS

| | | |
|---|---|---|
| GB | 2496386 A | 11/2011 |
| WO | 2007087729 A1 | 8/2007 |

OTHER PUBLICATIONS

'Using Electronic Structured Document as an Interface for Knowledge Based System':Parfouru, 2006.*

Li, J., et al., "Computer System for Process Control Based on Data-Driven," IEEE Symposium on Electrical & Electronics Engineering (EEESYM), pp. 463-467 (Jun. 24-27, 2012).

Thuong, O., et al., "System and method for categorizing events," GE Co-Pending Application No. PCT/EP2013/072207, filed on Oct. 23, 2013.

Green, D. L., et al., "Method for asset monitoring to identify anomalies and isolate faults,", GE Co-Pending Application No. 1402343.6, filed on Feb. 11, 2014.

Preliminary Search Report and Written Opinion issued in connection with corresponding FR Application No. 1557885 dated Oct. 13, 2017.

GB Combined Search and Examination Report dated Feb. 10, 2015 which was issued in connection with GB Application No. 1415079.1 which was filed on Aug. 26, 2014.

* cited by examiner

SYSTEM FOR BUILDING AND DEPLOYING INFERENCE MODEL

TECHNICAL FIELD

Embodiments of the present invention relate to systems for the building and deploying of inference models for use in remote condition monitoring of fleets of different assets. Without seeking to limit the applicability of the invention, an embodiment of the present invention is applicable to the remote condition monitoring of aircraft engines or components thereof, other systems or components of an aircraft, or other forms of asset.

BACKGROUND

In many sectors of industry and transportation, the remote condition monitoring of an asset is undertaken to enable an operator to infer the current state of health of the asset and/or predict its future health. Such systems are known in the aviation industry, with aircraft engine manufacturers monitoring data received from the engines of one or more aircraft in-flight. The monitoring may be undertaken firstly, to detect any anomalous behaviour in an asset (for example, an excessively high reading of temperature or pressure in a stage of a high pressure turbine of a gas turbine engine), and secondly, to establish whether such anomalous behaviour indicates a current fault condition, and if so, to classify the current fault condition. Known condition monitoring systems employ statistical models which, upon receiving operational data from an operating asset, are able to infer from the received data whether it is indicative of a fault condition in the asset.

However, the statistical models which underpin such known remote condition monitoring systems require substantial rewriting of the underlying source code used to create the statistical models to cater for the different characteristics of different assets. By "different" assets is meant assets which are of the same category, but differ in one or more aspects of their construction. Such rewriting of the source code requires specialist expertise and would commonly be undertaken by skilled computer scientists This rewriting would likely be necessary even where the different assets are in a common category (for example, a category of "gas turbine engines"), but differ from each other in one or more aspects of their construction. For example, the statistical models used for the condition monitoring of a fleet of a first model of aircraft gas turbine engine will differ from the models used for the condition monitoring of a fleet of a second model of aircraft gas turbine engine, even where there is commonality in some of the component parts of the two engine models. This applies even where the two engine models originate from the same engine manufacturer. Differences in construction between the two engine models may well result in different operating envelopes and behavioural responses for common parameters in corresponding components of the two engine models. Consequently, known remote condition monitoring systems have required significant time and effort by skilled computer scientists for each and every engine model to ensure that the statistical models developed are able to accurately detect and categorise anomalous behaviour for a given engine model. This problem applies equally to remote conditioning monitoring systems used to detect and categorise anomalous behaviour in other categories of asset.

There is therefore a need to provide a more efficient way of constructing an inference model for use in remote condition monitoring of assets, which is adaptable to reduce the time and effort needed in constructing remote condition monitoring systems for assets which are of the same category but differ in their construction.

SUMMARY OF THE INVENTION

Accordingly, there is provided a system for building and deploying one or more inference models for use in remote condition monitoring of a first fleet of a first asset, the system comprising (a) at least one of a configuration file and a compiled configuration database, wherein one or both of the configuration file and the compiled configuration database is editable and readable by a user and comprises model configuration data for subsequent use by a model builder application to construct one or more desired inference models for the first asset, the model configuration data customised to the first asset and the desired one or more inference models; and (b) a model builder application, the model builder application configured to: receive the model configuration data from the configuration file and/or compiled configuration database; and operate in a learning mode and a runtime mode, according to the received model configuration data.

For the learning mode, the model builder application is configured to receive historical operational data corresponding to a plurality of operating states of the first asset; call one or more processing algorithms, the called for one or more processing algorithms determined by the model configuration data; and construct—using the received model configuration data, the received historical operational data and the called for one or more processing algorithms—the one or more desired inference models such that the one or more inference models are operable to infer a status of one or more of the first assets in the first fleet from operational data received from the one or more of the first assets in the first fleet during operation of the one or more of the first assets.

For the runtime mode, the model builder application is configured to receive operational data from one or more of the first assets in the first fleet during operation of the one or more of first assets; and use at least one of the constructed one or more inference models to process the received operational data to thereby infer a status of the one or more of the first assets from the received operational data.

A second aspect of the invention provides a method of constructing one or more inference models for use in remote condition monitoring of a first fleet of a first asset, the method comprising: (a) providing at least one of a configuration file and a compiled configuration database, wherein one or both of the configuration file and the compiled configuration database is editable and readable by a user and comprises model configuration data for subsequent use by a model builder application to construct one or more desired inference models for the first asset, the model configuration data customised to the first asset and the desired one or more inference models; (b) providing the model builder application; (c) the model builder application receiving the model configuration data from the configuration file and/or compiled configuration database; and (d) operating the model builder application in a learning mode according to the received model configuration data.

In the learning mode the model builder application receives historical operational data corresponding to a plurality of operating states of the first asset; calls one or more processing algorithms, the called for one or more processing algorithms determined by the model configuration data; and constructs—using the received model configuration data, the received historical operational data and the called for one or more processing algorithms—the one or more desired inference models, the inference models thereby operable to infer a status of one or more of the first assets in the first fleet from operational data received from the one or more of the first assets in the first fleet during operation of the one or more of the first assets.

In a third aspect of the invention, the method comprises subsequent steps of operating the model builder application in a runtime mode according to the model configuration data received by the model builder application, wherein in the runtime mode the model builder application receives operational data from one or more of the first assets in the first fleet during operation of the one or more of the first assets; and uses at least one of the constructed one or more inference models to process the received operational data to thereby infer a status of the one or more of the first assets from the received operational data.

In a fourth aspect, the method is further adapted to construct one or more inference models for use in remote condition monitoring a second fleet of a second asset, wherein the first and second assets are of a common category but differ in their construction, wherein step (a) is performed for the second asset to provide a corresponding second asset configuration file and/or compiled configuration database comprising model configuration data customised to the second asset and one or more desired inference models for the second asset; step (c) is performed for the second asset, the model builder application receiving the model configuration data from the corresponding second asset configuration file and/or compiled configuration database; and wherein step (d) is performed for the second asset to thereby construct the one or more desired inference models for the second asset, the one or more desired inference models thereby operable to infer a status of one or more of the second assets in the second fleet from operational data received from the one or more of the second assets in the second fleet during operation of the one or more of the second assets.

In a further aspect, the method of the fourth aspect is adapted to comprise subsequent steps of operating the model builder application in a runtime mode according to the customised second asset model configuration data received by the model builder application, wherein in the runtime mode the model builder application receives operational data from one or more of the second assets in the second fleet during operation of the one or more of the second assets; and uses at least one of the constructed one or more inference models of the second asset to process the received operational data of the one or more of the second assets to thereby infer a status of the one or more of the second assets from the received operational data.

The asset is not limited to any sphere of technology and may include (without limitation) mechanical, electrical, electro-mechanical, software/hardware systems. By way only of example and without seeking to limit the scope of the invention, the asset may be an aircraft engine, a flight control system of an aircraft, or a wind turbine. These exemplary categories of asset are commonly expected to operate semi- or fully-autonomously away from the presence of any maintenance staff. Remote condition monitoring systems are useful in helping to identify or predict the onset of a fault condition in such autonomously operating assets. A non-limiting example of first and second assets which are of a common category is a first model of aircraft gas turbine engine and a second model of aircraft gas turbine engine. Whilst occupying a common category of aircraft gas turbine engines, the first and second models of aircraft gas turbine engine (i.e. the first and second assets) will differ from each other in their construction, and consequently in their behavioural response. Consequently, the inference model(s) necessary to infer a status of a given one of the first asset (for example, the first model of engine) from operational data received from the given first asset will necessarily differ from the inference model(s) necessary to infer a status of a given one of the second asset (for example, the second model of engine) from operational data received from the given second asset. An inference model constructed by the system or method of the invention for the first asset would be applicable to use in inferring the status of any one of the first assets in the first fleet from operational data received from the one asset during its operation.

The learning mode is a mode of operation of the model builder application in which the one or more inference models are constructed. The runtime mode is a mode of operation of the model builder application in which the inference model(s) constructed in an earlier learning mode for the first asset are applied in the analysis of operational data received from one or more of the first assets of the first fleet during operation of the one or more first assets. The system and method of an embodiment of the present invention is equally applicable to use for the second fleet of second assets—both in the learning mode and runtime mode. Consequently, where the system and method is described below with reference to the first asset, unless stated to the contrary, the system and method should also be regarded as being suitable for the second asset. The model configuration data for the second asset will necessarily contain differences when compared to that for the first asset.

The inferred status which results from the runtime mode in an embodiment is (i) an indicator as to the presence of an anomaly in operation of the one or more of the first assets in the first fleet; and/or (ii) a classification of the indicated anomaly into one or more probable fault conditions in the one or more of the first assets of the first fleet. Dependent upon the complexity of the constructed inference model(s), the model(s) may even be able to predict an estimated time to failure for the one or more of the first assets (or a component part thereof).

The inferred status desired by a User from the runtime mode is likely to affect the nature of the inference model which is required from and constructed in the learning mode. By way of example, an inference model suitable for providing an indicator as to the presence of an anomaly (as in (i) above) is likely to have less complexity and different functionality relative to an inference model suitable for classifying the indicated anomaly (as in (ii) above).

The accuracy and functional abilities of a given inference model to infer the status of a given one of the first assets from its operational data in the runtime mode are dependent upon the quality and variety of historical operational data which is fed to the model builder application in the learning mode. The historical operational data should in an embodiment correspond to both a plurality of normal operating states and a plurality of possible fault conditions for the first asset. The historical operational data is in an embodiment derived from across the first fleet of the first assets, rather than only originating from a single one of the first asset. This would thereby enhance the ability of the constructed inference model(s) to infer (in the runtime mode) whether operational data received from and during operation of a given one of the first asset is indicative of a fault condition and/or to classify the fault condition. Considering again the example of where the first asset is a first model of aircraft gas turbine engine, the normal operating states of the historical operational data may include the peak thrust loading conditions encountered during take-off of an aircraft incorporating such an engine model, as well as the thrust conditions during cruise at a number of different altitudes of the aircraft, plus thrust conditions during landing; the data may also be provided based upon a plurality of different climatic conditions in which the given engine model has been operated. The same variety should in an embodiment also be present in the part of the historical operational data representative of one or more fault conditions. As well as being based upon in-service data, the historical data may include experimental data from testing of the engine model on a test rig to simulate different normal operating states and fault conditions. Non-limiting examples of fault conditions include a turbine blade failure, ingestion of one or more birds into the engine, and failure of one or more of the injectors in the combustion chamber of the engine. Obviously, the nature of the historical operational data will differ dependent upon the particular type of asset under consideration.

As will be explained in later paragraphs, the system and method of the invention can function with the presence of the configuration file and no compiled configuration database, or alternatively with the presence of the compiled configuration database and no configuration file. In a further alternative, an embodiment of the invention uses both of the configuration file and the compiled configuration database. The use of the phrase "the configuration file and/or compiled configuration database" encompasses these various different scenarios.

In an embodiment, the model builder application is a computer executable file. The model builder application undertakes the constructing of the one or more inference models in the learning mode. The model builder application constructs the one or more inference models according to the information contained in the model configuration data received from the configuration file and/or compiled configuration database, with this information having been customized to the first asset and the desired one or more inference models. As set out in the appended claims, in the runtime mode the model builder application also employs at least one of the constructed inference models to infer a status of one or more of the first assets from operational data received from the one or more first assets during its operation.

Essentially, the system and method of the invention compartmentalizes i) the high level information which defines various characteristics associated with the first asset and the desired one or more inference models from ii) the complex processing algorithms and software coding which are necessary to construct the one or more inference models. The high level information of (i) is contained in the model configuration data of the editable and readable configuration file and/or compiled configuration database. The complex processing algorithms and supporting software coding of (ii) is contained in the model builder application or communicatively coupled thereto. This compartmentalization takes advantage of an embodiment of the present invention of the fact that for different assets in a common category (for example, the first and second models of aircraft gas turbine engines mentioned above), the constructing of corresponding inference models for the different assets is likely to employ a common toolkit of underlying processing algorithms and supporting software coding. The use of the editable and readable configuration file and/or compiled configuration database provides a location for defining data which is specific to the structural and/or performance characteristics for the first asset (or, alternatively, the second asset), as well as for indicating a functionality required of the desired one or more inference models for the first (or second) asset, i.e. the "model configuration data". In the context of the above non-limiting example of first and second assets being respective first and second models of aircraft gas turbine engines, the model configuration data customised for the first model of aircraft gas turbine engine will differ from the model configuration data customised for the second model of aircraft gas turbine engine.

In an embodiment, the system (and related method) comprises the configuration file, with the configuration file being directly editable and readable by a user and comprising the model configuration data. Conveniently, the configuration file is provided in the form of a spreadsheet or a file in extensible mark-up language (xml) format. If provided as a spreadsheet, the spreadsheet may include one or more interlinked worksheets. Regardless of the specific format of the configuration file, the configuration file is directly editable and readable by a user. An advantage of an embodiment of the present invention of such a configuration file is that it provides a relatively simple interface for a non-skilled user to provide the information necessary for the model builder application to construct the one or more inference models.

Where the configuration file contains the model configuration data, the system (and related method) in an embodiment also includes the compiled configuration database, the compiled configuration database configured to receive the model configuration data from the configuration file and to store the model configuration data so received in a compiled object code format readable by the model builder application, wherein the model builder application is configured to receive the compiled model configuration data by accessing the compiled configuration database. In an embodiment, the compiled configuration database incorporates or is coupled with a compiler to compile data received from the directly editable and readable configuration file. By storing the model configuration data in a compiled object code format, the compiled configuration database enhances the speed at which the model builder application is able to access and understand the model configuration data. This provides advantages in an embodiment where the model builder application requires access to the same model configuration data on multiple occasions (for example, during the learning mode), with the storing of the model configuration data in a compiled object code format assisting in reducing the time required for the model builder application to access the model configuration data compared to where the model configuration data is stored in a non-compiled format. Conveniently, the model configuration data of the configuration file comprises an address for the location of the compiled configuration database.

Alternatively, the system (and related method) may dispense with the use of the configuration database by providing a compiler in a communication pathway between the configuration file and the model builder application, the model builder application configured to directly receive the model configuration data from the configuration file via the compiler without intermediate storage in a compiled format, the compiler operable to convert the model configuration data to a compiled object code format readable by the model builder application. This variant allows for avoiding the use of a configuration database (or similar) for storing the model configuration data in a compiled format, but may necessitate repeated use of the compiler for each and every occasion the model builder application wishes to access the same model configuration data.

In a further alternative configuration, the system (and related method) may dispense with the use of the configuration file, and instead comprise the compiled configuration database, the compiled configuration database comprising the model configuration data in a compiled format, the system further comprising a user interface operable for a user to interact directly with the compiled configuration database to at least one of (i) enter the model configuration data into the compiled configuration database; and (ii) edit model configuration data already stored within the compiled configuration database.

This variant of an embodiment of the present invention allows a user to interact directly with the configuration database to enter model configuration data within the configuration database and also to edit model configuration data already contained therein. In an embodiment, the user interface comprises a compiled software application communicably coupled with the compiled configuration database to enable entry and/or editing of the model configuration data by a user. Such a compiled software application would provide a convenient interface to enable a user to enter and/or edit the model configuration data within the configuration database.

The above-described compartmentalization and the use of an editable and readable configuration file and/or compiled configuration database allows someone other than a skilled software specialist to provide the system with instructions sufficient to enable the model builder application to create one or more inference models customised to the first asset (or, alternatively, the second asset). The processing algorithms called and employed by the model builder application will differ in complexity, dependent upon the complexity of the task that they are performing. Some of the processing algorithms will be of low level functionality; for example, for performing smoothing, trending and filtering tasks on the historical operational data received for the first asset during the learning mode or on the operational data received from one or more of the first assets in the first fleet during the runtime mode. Others of the processing algorithms will have relatively higher level functionality in constructing of the one or more inference models. For example, these higher level processing algorithms may coordinate the operations of and use the results of the low level functionality algorithms to thereby construct the one or more inference models during the learning mode.

Conveniently, at least one of the one or more processing algorithms is integrated within the model builder application. Alternatively or in addition, at least one of the one or more processing algorithms is comprised in one or more servers and/or databases with which the model builder application is communicatively coupled. In this latter case, the model configuration data in an embodiment comprises an address for the location of at least one of the one or more servers and/or databases with which the model builder application is communicatively coupled. In either case, the processing algorithms are separate and distinct from the model configuration data. So, whilst the configuration file and/or compiled configuration database may contain instructions, inputs or other data (i.e. the "model configuration data") which will be subsequently used by a given processing algorithm referenced in the file and/or database, the file and/or database does not itself contain all of the processing algorithms necessary to construct the one or more inference models. This makes editing and understanding of the configuration file and/or compiled configuration database easier for a non-skilled user of the system, i.e. someone other than a skilled computer scientist.

As stated above, the model configuration data is customised to the first asset and the desired one or more inference models. Conveniently, the model configuration data comprises one or more of an identifier of the first asset and a classification of a category into which the first asset falls; an indicator of the functionality required of the desired one or more inference models; values attributed to one or more parameters associated with operation of the first asset; an identity of at least one of the one or more processing algorithms for subsequent use by the model builder application in constructing the desired one or more inference models; and one or more input parameters associated with at least one of the one or more processing algorithms.

In the context of the non-limiting example of the first asset being a given make and model of aircraft gas turbine engine, the identifier of the first asset may be the make and model of the engine, with the classification being one of gas turbine engines. However, the nature of the identifier and the category classification will vary dependent upon the nature of the first asset.

Non-limiting examples of indicators of the functionality required of the desired one or more inference models include specifying a desired output required from use of an inference model in the runtime mode, and whether the desired inference model to be constructed in the learning mode is intended to indicate only the presence of an anomaly in operation of a given asset and/or is intended to classify the indicated anomaly.

Non-limiting examples of the values attributed to one or more parameters associated with operation of the first asset include values of peak take-off thrust, thrust at cruising altitude, and specific fuel consumption rates for a first model of aircraft gas turbine engine. However, the nature of these values and their associated parameters will vary dependent upon the nature of the first asset; for example, if the first asset were a flight control system, these values would likely include values of voltage or current.

Non-limiting examples of the one or more input parameters associated with at least one of the one or more processing algorithms are pressure, temperature, or spatial and/or temporal shifts in pressure and temperature encountered in a given component of a first model of aircraft gas turbine engine. Again however, the nature of the input parameters will differ dependent upon the asset category. As indicated above, if the first asset were, say, in the category of flight control systems, the input parameters would likely include various voltages or currents in one or more parts of the flight control system.

Additionally, the model configuration data conveniently further comprises one or more of values attributed to one or more physical properties of the first asset; values defining an upper and/or lower bound for at least one of the one or more input parameters; settings for at least one of the one or more processing algorithms; a control setting defining whether the model builder application is to operate in the learning mode or the runtime mode; and an alert setting defining an action to be taken or a warning to be given to a user of the system dependent upon an output of the constructed one or more inference tools during use in the runtime mode.

Non-limiting examples of values attributed to one or more physical properties of the first asset include a mass or dimension(s) of one or more components of a first model of aircraft gas turbine engine. However, the physical properties used will vary dependent upon the nature of the first asset.

Non-limiting examples of values defining an upper and/or lower bound for at least one of the one or more input parameters include a peak value of pressure or temperature.

These bounding values may include the maximum permissible temperature and/or pressure which can be sustained by one or more components of a first model of aircraft gas turbine engine; for example, a peak allowable temperature in the combustion chamber, or a peak permissible temperature for one or more of the turbine blades in the turbine section of the engine. Additionally or alternatively, these values may represent minima or maxima values of operating parameters which, if present in the received historical operational data (for the learning mode) or the operating data received during operation of the first assets (for the runtime mode), would be clearly nonsensical and thereby instead indicate the presence of a fault in a sensor responsible for providing the data. More particularly, in such a case, the model builder application would ignore data received during the learning or runtime modes whose values exceed the defined minima or maxima, thereby avoiding the model builder application being skewed by erroneous sensor readings when i) constructing the inference models (during the learning mode) or ii) using the constructed inference models (during the runtime mode).

Non-limiting examples of an alert setting defining an action to be taken or a warning to be given to a user of the system dependent upon an output of the constructed one or more inference tools during use in the runtime mode include providing an audible or visual warning signal to the user of the system to provide them with forewarning of an anomaly having been detected by the system and/or to provide them with information identifying the cause of the anomaly. The detected anomaly may, for example, be variability in excess of a given range for the mass flow rate through the turbine section of a first model of aircraft gas turbine engine, with the identified cause of the anomaly being a fractured turbine rotor blade or a fault in the flow of fuel to the combustor of the engine.

The precise nature of the identifiers, indicators, parameters, values and settings referred to above will be dependent upon the category of the first asset. If the first asset were, say, in the category of aircraft flight control systems, the values and settings may well relate to electrical inputs/outputs provided by the flight control system. As indicated earlier in the description, the system and method of an embodiment of the present invention are applicable to any asset in which there exists a need or desire for remote condition monitoring of the asset. Such assets may include mechanical, electrical, electro-mechanical and hardware/software systems (or a combination thereof).

BRIEF DESCRIPTION OF DRAWINGS

Examples of embodiments of the present invention are described with reference to the following accompanying drawings.

Please note that the figures are intended to illustrate non-limiting examples of embodiments of the present invention.

DETAILED DESCRIPTION

Figure 1:
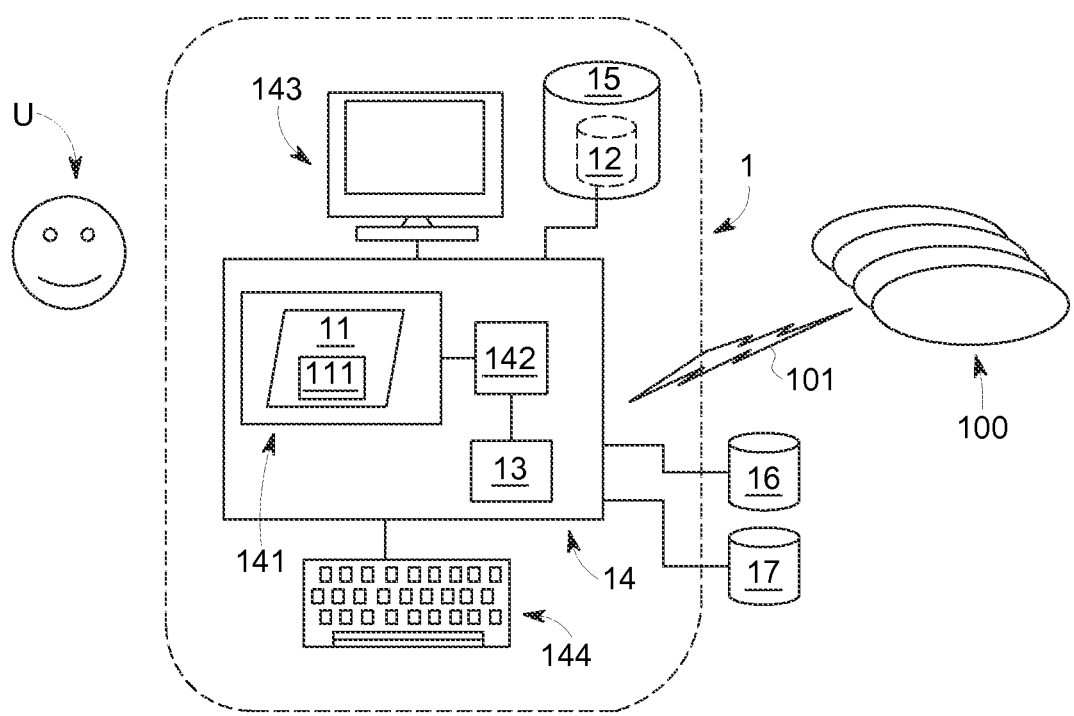
FIG. 1 shows a first exemplary system of an embodiment of the present invention in conjunction with a first fleet of a first model of aircraft gas turbine engine.

FIG. 1 shows a first exemplary system 1 whose elements are shown encompassed within a dashed boundary. FIG. 1 shows the system 1 in use with a first fleet of first assets 100. The illustrated first fleet of first assets 100 consist of a plurality of a first model of aircraft gas turbine engine in use on a number of aircraft. However, as indicated in the preceding general description, the asset is not limited to any sphere of technology. In other non-illustrated embodiments, the asset may be a flight control system of an aircraft, a wind turbine, or take any other form. The system and method of embodiments of the present invention is applicable to any asset for which there may be a need or a desire to remotely monitor the condition of the asset.

The system 1 of FIG. 1 has a configuration file 11, a compiled configuration database 12 and a model builder application 13. The configuration file 11 is contained within a memory module 141 of a computer 14. The computer 14 also has a processor 142 coupled to the memory module 141, with the processor 142 adapted to run the model builder application 13. The model builder application 13 is an executable computer application, which is able to execute one or more tasks when run on the processor 142. The computer 14 is coupled to a display screen 143 visible to a user U of the system 1 to enable the user to read the contents of the configuration file 11. The computer 14 is also coupled to an input device 144, such as a keyboard, to enable the user U to edit the configuration file 11 and thereby influence the functioning of the model builder application 13.

In the illustrated example of FIG. 1, the computer 14 is communicatively coupled to a first server 15, a second server 16 and a third server 17. The communicative coupling may be enabled by either or both of a wired or wireless connection between the computer 14 and each of the servers 15, 16, 17—indicated in FIG. 1 by the continuous lines extending between the servers 15, 16, 17 and the computer 14. In the example shown, the first server 15 contains the compiled configuration database 12. The second server 16 contains a library of processing algorithms which can be accessed and used by the model builder application 13. In an alternative example not shown in the figures, the processing algorithms are contained on the computer 14; for example, by being stored locally within the memory module 141 or encoded to be integrated directly within the model builder application 13. The third server 17 contains a library of historical operational data corresponding to normal operation and fault conditions for the first model of aircraft gas turbine engine 100. The origin of this historical operational data is discussed in the preceding general description. In an embodiment this historical operational data originates from multiple ones of the first model of aircraft gas turbine engine 100 which collectively form the first fleet 100. Normal operating states encompassed by the historical operational data may include operation of the first model of aircraft gas turbine engine at peak rated thrust (as might be encountered during take-off of an aircraft incorporating the first model of aircraft gas turbine engine), and operation at cruise conditions at a number of different altitudes and for a number of different climatic states. Fault conditions encompassed by the historical operational data may include a turbine blade failure within the first model of aircraft gas turbine engine, ingestion of one or more birds into the engine, and failure of one or more of the injectors in the combustion chamber of the engine. In alternative embodiments not shown in the figures, the contents of the three different servers 15, 16, 17 may be consolidated into fewer servers; for example, the compiled configuration database 12, the processing algorithms, and the historical operational data may be located on a common server communicatively coupled to the computer 14.

For the system 1 of FIG. 1, the configuration file 11 is in a format which is directly editable and readable by the user U. Non-limiting examples of the format of the configuration file 11 include a spreadsheet file of one or more interlinked worksheets, or a file in extensible mark-up language (xml) format. By way of example, an example of the configuration file 11 may include one or more pull-down menus allowing the user U to select one or more options corresponding to characteristics of the first asset 100 and the inference model which is desired by the user U. As shown in FIG. 1 (and also in FIG. 3), the configuration file 11 contains model configuration data 111. The model configuration data 111 is configured for subsequent use by the model builder application 13 to enable the model builder application to construct one or more inference models for the first model of aircraft gas turbine engine 100. The model configuration data 111 is customised to the first model of aircraft gas turbine engine 100 and to whatever inference model is desired by the user U. An exemplary form of this model configuration data 111 is explained in more depth in later paragraphs by reference to FIG. 3.

The compiled configuration database 12 shown in FIG. 1 is configured to receive the model configuration data 111 from the configuration file 11 and to store the model configuration data so received in a compiled object code format readable by the model builder application 13. In the example system 1 illustrated in FIG. 1, the compiled configuration database 12 is contained on the first server 15. The model builder application 13 is configured to access the compiled configuration database 12 on the first server 15 to thereby access the compiled model configuration data 111 stored in the configuration database 12. By storing the model configuration data 111 in a compiled object code format, the compiled configuration database 12 provides for speed of access of the model builder application 13 to the model configuration data 111 in a format which is readily understandable to the model builder application. Although not shown in FIG. 1, the compiled configuration database 12 may include or be coupled with a compiler to compile mode configuration data 111 received from the directly editable and readable configuration file 11.

Figure 2:
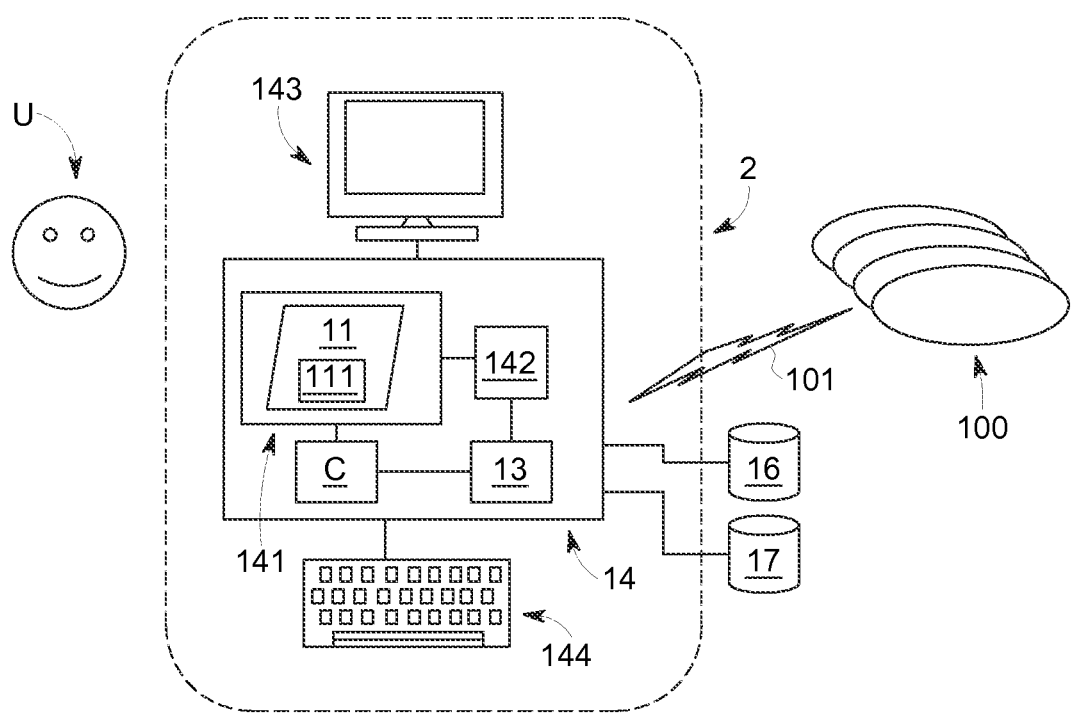
FIG. 2 shows a second exemplary system of an embodiment of the present invention in conjunction with the first fleet of the first model of aircraft gas turbine engine.

In the second exemplary system 2 shown in FIG. 2, a compiler C is provided between the memory module 141 and the model builder application 13, with there being no compiled configuration database 12 or equivalent means for storing the model configuration data 111 in a compiled object code format. The model configuration data 111 is conveyed to the model builder application 13 directly through the compiler C without any intermediate storage in a compiled object code format. In this second exemplary system 2, on each and every occasion when the model builder application 13 requires access to the model configuration data 111, the compiler C operates to compile the model configuration data 111 received from the configuration file 11 into an object code format. The compiler C therefore operates to compile the model configuration data 111 as demanded by the model builder application 13. In this manner, the system 2 of FIG. 2 avoids the use of a configuration database 12 (or equivalent) for storing the model configuration data 111 in a compiled format.

In an alternative exemplary system which is not shown in the drawings, the use of the configuration file 11 is dispensed with. In this alternative system, the compiled configuration database 12 contains the model configuration data 111 in a compiled format, with the system including a user interface operable to enable the user U to interact directly with the compiled configuration database to at least one of (i) enter the model configuration data 111 into the compiled configuration database 12; and (ii) edit model configuration data already stored within the compiled configuration database.

This variant of an embodiment the present invention allows the user to interact directly with the configuration database 12 to enter model configuration data 111 directly within the configuration database and also to edit model configuration data 111 already contained therein. In an embodiment, the user interface would include a compiled software application communicably coupled with the compiled configuration database 12 to enable entry and/or editing of the model configuration data by a user. Such a compiled software application provides a convenient interface to enable a user to enter and/or edit the model configuration data within the configuration database. The user interface may also include a display screen and keyboard input device (similar or the same as the display screen 143 and keyboard 144) to assist in interaction between the user U and the user interface.

For all of the systems described and/or illustrated, the model builder application 13 is operable in two distinct modes: a learning mode and a runtime mode—as explained in the preceding general description. Operation of the model builder application 13 in both the learning and runtime modes is determined by the model configuration data 111, with the model configuration data customised to the first model of gas turbine engine 100 and the inference model(s) desired by the user U. In the learning mode, the model builder application 13 operates to construct one or more inference models 19 (see FIG. 4) for the first model of aircraft gas turbine engine 100. In the learning mode, the model builder application 13 of the illustrated example is configured to access the third server 17 to acquire the historical operational data representative of the first model of aircraft gas turbine engine 100; access the second server 16 to call one or more of the processing algorithms contained on the second server, in accordance with the model configuration data 111; and construct—using i) the compiled model configuration data 111, ii) the acquired historical operational data and ii) the called for one or more processing algorithms—one or more inference models 19 for the first model of aircraft gas turbine engine 100.

As indicated in the preceding general description, the inference models 19 are constructed to have the capability, during a subsequent runtime mode of operation of the model builder application 13, to infer a status of any one of the engines in the first fleet 100 of the first model of aircraft gas turbine engine from operational data received from the given engine. The inference models 19 are mathematical computational models relating to the first fleet 100 of the first model of aircraft gas turbine engine. By virtue of the inference models 19 (see FIG. 4) being constructed based upon historical operational data representative of the first model of aircraft gas turbine engine 100, these mathematical models have the ability to draw inferences from realtime operational data received from one or more of the engines in the first fleet 100. These inferences include indicating whether an anomaly is present in operation of a given engine in the first fleet 100, and/or classifying the nature of the indicated anomaly.

The operation of the model builder application 13 in both the learning and runtime modes is dependent upon the content of the model configuration data 111—this applies regardless of the format in which the model configuration data is stored, i.e. whether one or both of a configuration file 11 and/or compiled configuration database 12 are employed. The model configuration data 111 is customised to the first model of aircraft gas turbine engine of the first fleet 100 and whatever inference model 19 is desired by the user U. The desired inference model 19 may be of a type which, in use in the runtime mode, provides the user U with an indicator as to the presence of an anomaly in operation of any one of the engines in the first fleet 100. Alternatively or in addition, the desired inference model may be of a type which, in use in a runtime mode, provides the user U with a classification of the indicated anomaly into one or more likely fault conditions for the given engine. Dependent upon the complexity of the desired inference model 19 which is constructed by the model builder application 13, the inference model provides an estimated time to failure for the given engine of the first fleet 100.

Figure 3:
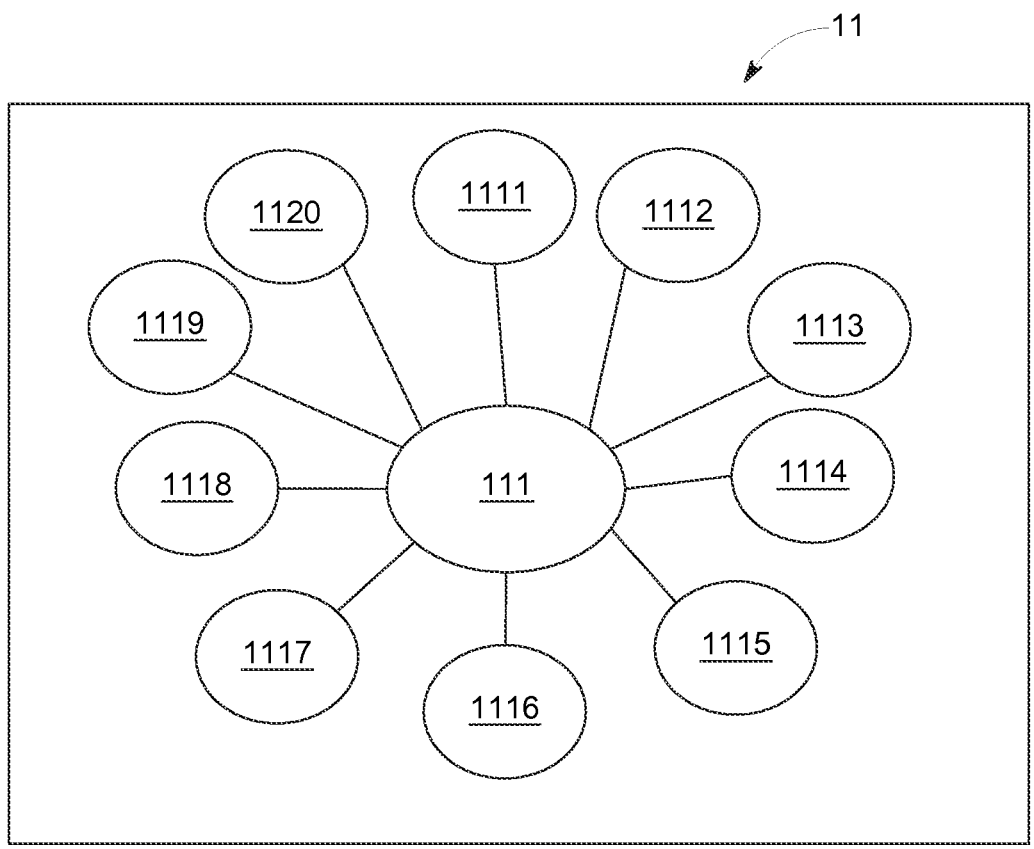
FIG. 3 shows an example of the contents of a configuration file suitable for use with the exemplary systems of FIGS. 1 and 2.

As indicated above, FIG. 3 shows an exemplary layout of the model configuration data 111 of the configuration file 11. The model configuration data 111 includes an identifier 1111 of the first asset 100 and a classification of a category into which the first asset falls. For the illustrated example, the identifier includes the make and model of the first model of aircraft gas turbine engine 100 which is to be the subject of the inference model(s) 19. For the illustrated example, the category classification is that of aircraft gas turbine engines; an indicator 1112 of the functionality required of the desired one or more inference models 19. For the illustrated example, this includes specifying one or more outputs required from use of an inference model 19 in the runtime mode, and whether the desired inference model is intended to enable indication of the presence of an anomaly in operation of an engine in the first fleet 100 and/or is intended to classify the indicated anomaly; values 1113 attributed to one or more parameters associated with operation of the first model of aircraft gas turbine engines 100. For the illustrated example, these values 1113 include values of peak take-off thrust, thrust at cruising altitude, and specific fuel consumption rates for the first model of aircraft gas turbine engine; an identity 1114 of at least one of the one or more processing algorithms for subsequent use by the model builder application 13 in constructing the one or more inference models 19; one or more input parameters 1115 associated with at least one of the one or more processing algorithms. For the illustrated example, the one or more input parameters 1115 include pressure, temperature, and spatial and/or temporal shifts in pressure and temperature encountered in a given component of the first model of aircraft gas turbine engine 100; values 1116 attributed to one or more physical properties of the first model of aircraft gas turbine engine. For the illustrated example, these values 1116 include a mass or dimension of one or more components of the first model of aircraft gas turbine engine 100; values 1117 defining an upper and/or lower bound for at least one of the one or more input parameters. For the illustrated example, these values 1117 include peak values of pressure and/or temperature, such as the maximum permissible temperature and/or pressure which can be sustained by one or more components of the first model of aircraft gas turbine engine 100. Additionally or alternatively, these values may represent minima or maxima values of pressure or temperature (or any other input parameter) which, if present in the received historical operational data for the learning mode or present in the operating data received during operation of the first model of aircraft gas turbine engine in the runtime model, would be clearly nonsensical and thereby instead indicate the presence of a fault in a sensor responsible for providing the data; settings 1118 for at least one of the one or more processing algorithms; a control setting 1119 defining whether the model builder application 13 is to operate in the learning mode or the runtime mode; and an alert setting 1120 defining an action to be taken or a warning to be given to a user of the system 1, 2 dependent upon an output of the constructed one or more inference models 19 during use in the runtime mode. The actions defined by the alert setting 1120 may include providing an audible warning signal or a visual warning signal to the user U to provide them with forewarning of an anomaly having been detected by the system 1,2 and/or to provide them with the user with an identity of the cause of the anomaly. Such a visual warning signal may be communicated to the User U via the display screen 143, with the display screen also incorporating a speaker (not shown in the figures) to enable communication of the audible warning signal to the User.

Figure 4:
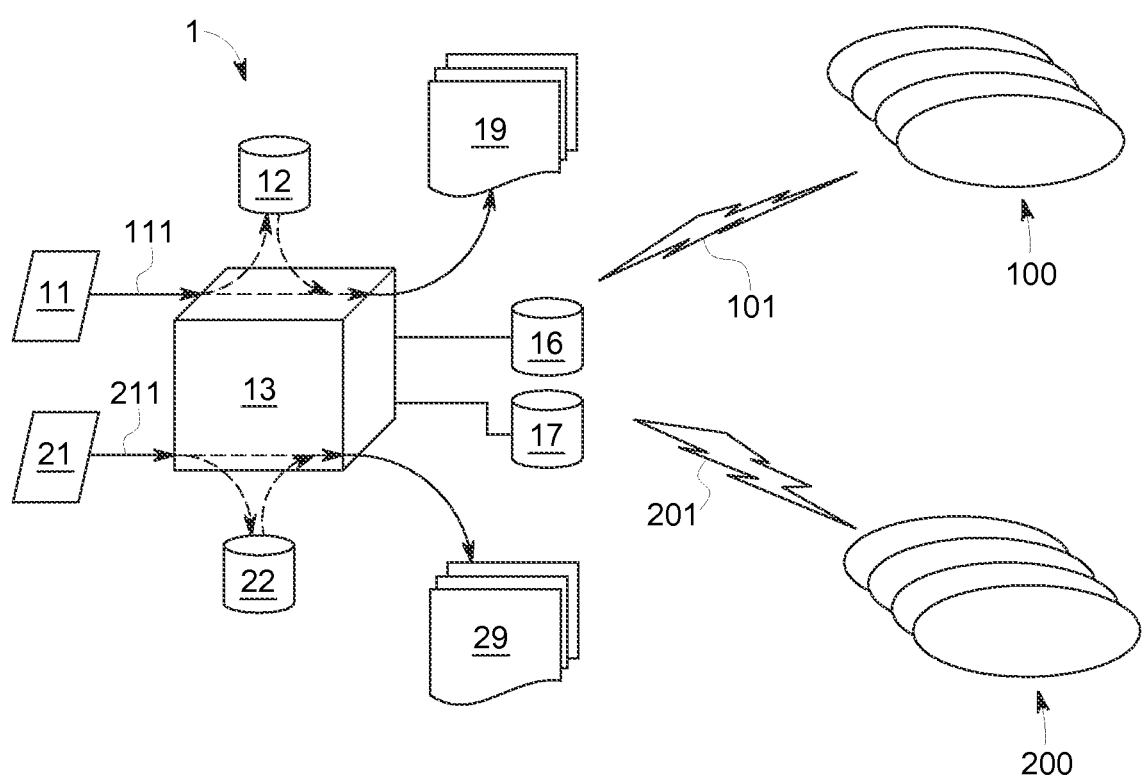
FIG. 4 shows the data flows between different features of the system of FIG. 1 during its operation for first and second fleets of corresponding first and second assets.

The adaptability of the systems 1, 2 to generate inference models customised to fleets of different assets is explained with reference to FIG. 4. FIG. 4 is a simplified representation of the features of the system 1 (with some features missing), but annotated to indicate the flow of data through the system 1 and the nature of the outputs of the system during the learning mode of operation of the model builder application 13. FIG. 4 shows the presence of the first fleet 100 of first assets, which (as stated previously) consists of a plurality of a first model of aircraft gas turbine engine in use on a number of aircraft. However, FIG. 4 also shows the presence of a second fleet 200 of second assets. The illustrated second fleet of second assets 200 consists of a plurality of a second model of aircraft gas turbine engine in use on a number of aircraft. It can therefore be seen that the first and second assets 100, 200 are of a common category of aircraft gas turbine engines. However, the first and second assets 100, 200 differ from each other in one or more aspects of their construction (and thereby in their performance) as a consequence of being two different models of engine. The configuration file 11 and the compiled configuration database 12 correspond to the first model 100 of aircraft gas turbine engine. However, also shown in FIG. 4 is a separate configuration file 21 and compiled configuration database 22, which correspond to the second model 200 of aircraft gas turbine engine. Although not illustrated in FIG. 4, in one example the configuration databases 12, 22 are both located on the first server 15. Alternatively, the configuration databases 12, 22 may be located on different respective servers which are communicable with the computer 14 and the model builder application 13. The model configuration data 111, 211 of the configuration files 11, 21 is customised to the respective first and second models of engine 100, 200 and to whatever inference model 19, 29 is desired for the respective first and second models of aircraft gas turbine engine 100, 200.

In the illustrated example of FIG. 4, the second server 16 contains the processing algorithms (as discussed previously for the system 1 of FIG. 1). Further, the third server 17 contains respective libraries of historical operational data corresponding to normal operation and fault conditions for the first model of aircraft gas turbine engine 100 and the second model of aircraft gas turbine engine 200.

In use in the learning mode, the model builder application 13 constructs a first set of inference models 19 corresponding to the first model of aircraft gas turbine engine 100 and a second set of inference models 29 corresponding to the second model of aircraft gas turbine engine 200. The model builder application 13 constructs the respective sets of inference models 19, 29 for the first and second engine models 100, 200 respectively using i) the compiled model configuration data 111, 211 stored in the respective compiled configuration databases 12, 22, ii) the historical operational data contained on the third server 17 corresponding to the respective first and second engine models 100, 200; and iii) the called for one or more processing algorithms contained on the second server 16. In the example illustrated in FIG. 4, the configuration files 11, 21 and compiled configuration databases 12, 22 for both the first and second models of aircraft gas turbine engine 100, 200 coexist with each other, with the model builder application 13 accessing the respective configuration databases 12, 22 sequentially or simultaneously when operating to construct the respective sets of inference models 19, 20. In an alternative example, the configuration file 22 may be produced by amendment of the contents of configuration file 11, with only one of the configuration files 11, 22 able to exist at a given point in time.

During the runtime mode, the model builder application 13 uses the respective set of inference models 19, 29 to infer the status of one or more of any of the engines in the first or second fleets 100, 200. In the runtime mode, the model builder application 13 receives operational data 101, 201 (more particularly at or close to realtime) from one or more of the engines in the respective first and second fleets 100, 200 (see FIG. 4). In the illustrated example of FIG. 4, this operational data 101, 201 is transmitted wirelessly from the first and second fleets 100, 200 of engines to be received by a transceiver (not shown) coupled to the model builder application 13. The model builder application 13 then uses the set of inference models 19, 29 which correspond to the respective fleet 100, 200 from which the operational data 101, 201 is received, to process the received operational data in accordance with the respective model configuration data 111, 211, to thereby infer a status of one or more of the engines of the first or second fleets 100, 200. As explained in the preceding general description, the inferred status may be an indication of the presence of an anomaly in operation of a given one of the engines in the first or second fleets 100, 200. Alternatively or in addition, the inferred status may be a classification of the detected anomaly, and/or a predicted time to failure of one or more components of the given engine.

The description uses examples to disclose the invention and also to enable a person skilled in the art to make and use the invention. For the avoidance of doubt, the invention as defined in the claims may include within its scope other examples that occur to those skilled in the art which may differ from the examples indicated in the figures of this application.

What is claimed is:

1. A computer-implemented system for building and deploying one or more inference models for use in remote condition monitoring of one or more first assets of a first fleet, the computer-implemented system comprising:
a memory module;
a processor communicatively coupled with the memory module; a server module communicatively coupled with the processor;
at least one of a configuration file stored in the memory module, and a compiled configuration database stored within the server module, both the at least one of the configuration file and the compiled configuration database (i) being directly editable and readable by a user and (ii) comprising a model configuration data containing information and being customized to the one or more first assets and the one or more inference models;
wherein the model configuration data is defined as a plurality of structural and performance characteristics of the one or more first assets; and
a model builder application being an executable computer application configured to (i) execute one or more tasks when run on the processor (ii) receive the model configuration data and (iii) operate in a learning mode;
wherein during operation of the learning mode:
the model builder application (i) receives historical operational data corresponding to a plurality of operating states of the one or more first assets (ii) calls one or more processing algorithms, the one or more processing algorithms being determined by the model configuration data and (iii) constructs the one or more inference models based on the received model configuration data, the received historical operational data and the called for one or more processing algorithms; and
the information is contained within the model configuration data, and the processing algorithms are integrated within the model builder application, the information and the processing algorithms thereby being separate from each other.

2. The computer-implemented system of claim 1, wherein the system further comprises the compiled configuration database, the compiled configuration database configured to receive the model configuration data from the configuration file and to store the model configuration data so received in a compiled object code format readable by the model builder application, wherein the model builder application is configured to receive the compiled model configuration data by accessing the compiled configuration database.

3. The computer-implemented system of claim 1, further comprising a compiler in a communication pathway between the configuration file and the model builder application, the model builder application configured to directly receive the model configuration data from the configuration file via the compiler without intermediate storage in a compiled format, the compiler operable to convert the model configuration data to a compiled object code format readable by the model builder application.

4. The computer-implemented system of claim 1, wherein the system comprises the compiled configuration database, the compiled configuration database comprising the model configuration data in a compiled format, the system further comprising a user interface operable for a user to interact directly with the compiled configuration database to at least one of:
enter the model configuration data into the compiled configuration database, and
edit model configuration data already stored within the compiled configuration database.

5. The computer-implemented system of claim 1, wherein at least one of the one or more processing algorithms is comprised in one or more servers and/or databases with which the model builder application is communicatively coupled.

6. The computer-implemented system of claim 1, wherein the model configuration data comprises one or more of:
- an identifier of the first asset and a classification of a category into which the first asset falls;
- an indicator of the functionality required of the desired one or more inference models;
- values attributed to one or more parameters associated with operation of the first asset;
- an identity of at least one of the one or more processing algorithms for subsequent use by the model builder application in constructing the desired one or more inference models; and
- one or more input parameters associated with at least one of the one or more processing algorithms.

7. The computer-implemented system of claim 1, further comprising a runtime mode in which the model builder application (i) receives operational data from the one or more first assets in the first fleet during operation of the one or more of the first assets; and (ii) uses at least one of the constructed one or more inference models of the one or more first assets to process the received operational data of the one or more of the first assets to thereby infer a status of the one or more of the first assets from the received operational data.

8. The computer-implemented system of claim 7, wherein the model configuration data further comprises one or more of:
- values attributed to one or more physical properties of the first asset;
- values defining an upper and/or lower bound for at least one of the one or more input parameters;
- settings for at least one of the one or more processing algorithms;
- a control setting defining whether the model builder application is to operate in the learning mode or the runtime mode; and
- an alert setting defining an action to be taken or a warning to be given to a user of the system dependent upon an output of the constructed one or more inference tools during use in the runtime mode.

9. A computer-implemented method of constructing one or more inference models for use in remote condition monitoring of one or more first assets of a first fleet, the method comprising:
- providing a memory module and a processor communicatively coupled with the memory module;
- providing a server module communicatively coupled with the processor and a model builder application being an executable computer application configured to execute one or more tasks when run on the processor;
- providing at least one of a configuration file being stored in the memory module and a compiled configuration database being stored in the server module, wherein one or both of the configuration file and the compiled configuration database (i) is directly editable and readable by a user and (ii) comprises a model configuration data containing information and being customized to the one or more first assets and the one or more inference models;
- wherein the model configuration data is defined as a plurality of structural and performance characteristics of the one or more first assets;
- dynamically configuring, via the processor, the model builder application based on the status of the one or more first assets and the one or more options selected by the user;
- receiving, by the model builder application, the model configuration data directly from the configuration file and/or compiled configuration database; and
- operating the model builder application in a learning mode according to the received model configuration data, wherein in the learning mode operating the model builder application comprises:
- receiving historical operational data corresponding to a plurality of operating states of across the one or more first assets of the first fleet and a plurality of fault conditions for the first asset;
- calling one or more processing algorithms, wherein the one or more processing algorithms is determined by the model configuration data; and
- constructing, by using the received model configuration data, the received historical operational data, and the one or more processing algorithms, the one or more desired inference models;
- wherein during operation of the learning mode, the information is contained within the model configuration data, and the processing algorithms are integrated within the model builder application, the information and the processing algorithms thereby being separate from each other.

10. The computer-implemented method of claim 9, wherein the method further comprises providing the compiled configuration database, the compiled configuration database configured to receive the model configuration data from the configuration file and to store the model configuration data so received in a compiled object code format readable by the model builder application, wherein the model builder application receives the compiled model configuration data by accessing the compiled configuration database.

11. The computer-implemented method of claim 9, further comprising providing a compiler in a communication pathway between the configuration file and the model builder application, the model builder application directly receiving the model configuration data from the configuration file via the compiler without intermediate storage in a compiled format, the compiler operable to convert the model configuration data to a compiled object code format readable by the model builder application.

12. The computer-implemented method of claim 9, wherein the method comprises providing the compiled configuration database, the compiled configuration database comprising the model configuration data in a compiled format, the method further comprising:
- providing a user interface operable for a user to interact with the compiled configuration database to at least one of:
- enter the model configuration data into the compiled configuration database; and edit model configuration data already stored within the compiled configuration database.

13. The computer-implemented method of claim 9, wherein at least one of the one or more processing algorithms is comprised in one or more servers and/or databases with which the model builder application is communicatively coupled.

14. The computer-implemented method of claim 9, wherein the model configuration data comprises one or more of:
- an identifier of the first asset and a classification of a category into which the first asset falls,
- an indicator of the functionality required of the desired one or more inference models, values attributed to one or more parameters associated with operation of the first asset, an identity of at least one of the one or more processing algorithms for subsequent use by the model builder application in constructing the desired one or more inference models, and one or more input parameters associated with at least one of the one or more processing algorithms.

15. The computer-implemented method of claim 9, further comprising:

operating the model builder application in a runtime mode according to the model configuration data received by the model builder application, wherein in the runtime mode operating the model builder application comprises:

receiving operational data directly from one or more of the first assets in the first fleet during operation of the one or more of the first assets; and using at least one of the constructed one or more inference models to process the received operational data to thereby infer a status of the one or more of the first assets from the received operational data.

16. The computer-implemented method of claim 9, further comprising:

constructing one or more inference models for use in remote condition monitoring a second fleet of a second asset, wherein the first and second assets are of a common category but differ in their construction, wherein:

providing at least one of a configuration file and a compiled configuration database is performed for the second asset to provide a corresponding second asset configuration file and/or compiled configuration database comprising model configuration data customized to the second asset and one or more desired inference models for the second asset, receiving the model configuration data is performed for the second asset, the model builder application receiving the model configuration data from the corresponding second asset configuration file and/or compiled configuration database, and operating the model builder application is performed for the second asset to thereby construct the one or more desired inference models for the second asset, the one or more desired inference models thereby operable to infer a status of one or more of the second assets in the second fleet from operational data received from the one or more of the second assets in the second fleet during operation of the one or more of the second assets.

17. The computer-implemented method of claim 16, further comprising:

operating the model builder application in a runtime mode according to the customized second asset model configuration data received by the model builder application, wherein in the runtime mode operating the model builder application comprises:

receiving operational data from one or more of the second assets in the second fleet during operation of the one or more of the second assets; and using at least one of the constructed one or more inference models of the second asset to process the received operational data of the one or more of the second assets to thereby infer a status of the one or more of the second assets from the received operational data.

* * * * *